United States Patent [19]

Liessner

[11] Patent Number: 5,079,549
[45] Date of Patent: Jan. 7, 1992

[54] DIGITAL RESOLVER WITH A SYNCHRONOUS MULTIPLE COUNT GENERATION

[75] Inventor: Christopher W. Liessner, Wilmington, Mass.

[73] Assignee: Dynamics Research Corporation, Wilmington, Mass.

[21] Appl. No.: 572,672

[22] Filed: Aug. 24, 1990

[51] Int. Cl.$^5$ .................. H03M 1/48; H03K 23/62
[52] U.S. Cl. .................. 341/116; 341/114; 377/17; 377/45
[58] Field of Search .............. 341/112, 113, 114, 115, 341/116, 117; 318/524, 660, 661; 377/17, 45

[56] References Cited

U.S. PATENT DOCUMENTS

| | | | |
|---|---|---|---|
| 3,641,565 | 2/1972 | Ivers et al. | 341/116 |
| 4,119,959 | 10/1978 | Lanton | 341/116 |
| 4,164,729 | 8/1979 | Simon et al. | 341/116 |
| 4,467,320 | 8/1984 | McPhee | 341/115 |
| 4,468,745 | 8/1984 | Kjosavik | 341/116 |
| 4,594,579 | 6/1986 | Schmitt et al. | 341/116 |
| 4,881,248 | 11/1989 | Korechika | 377/17 |
| 4,933,674 | 6/1990 | Gasperi et al. | 341/116 |
| 4,965,816 | 10/1990 | Shih et al. | 377/17 |

OTHER PUBLICATIONS

"Technology Update": Synchro/Resolver Converters Bring Low Cost and Small Size to Motion-Control Systems, EDN Oct. 30, 1986, pp. 61-68.

Primary Examiner—Howard L. Williams
Attorney, Agent, or Firm—Weingarten, Schurgin, Cagnebin & Hayes

[57] ABSTRACT

A digital resolver is provided that accepts an analog representation of an angular or linear displacement within a reticle modulation cycle of a rotatable or translatable member, and provides a highly accurate output digital representation of the displacement within the cycle, even during rapid movement of the member. An encoder cooperative with the interpolator receives an analog signal that represents the displacement, and yields a pair of quadrature-phased sine wave signals accordingly. These signals are provided to the interpolator, wherein each is multiplied by a stored digital representation of a trigonometric function of the output digital signal. The resulting products are then added so as to provide an error signal which is used to drive a digital control loop, such that a digital output signal is provided that represents displacement within a reticle cycle. The control loop includes an up-down counter, and an asynchronous count generator operative to receive the error signal and drive the counter promptly thereafter. Within the asynchronous count generator, no clock signal is employed. Instead, an asynchronous digital circuit promptly provides a count pulse to an appropriate input of the up-down counter, the output providing an accurate digitized representation of the displacement within a reticle cycle of the member. The counter output is also fed back to be multiplied by the quadrature-phased signals.

5 Claims, 6 Drawing Sheets

DIGITAL RESOLVER WITH A SYNCHRONOUS MULTIPLE COUNT GENERATION

FIELD OF THE INVENTION

This invention relates to digital resolvers for use with rotary or linear encoders, and particularly to digital resolvers capable of tracking a rapidly changing input signal.

BACKGROUND OF THE INVENTION

Electro-optical shaft encoders are often employed to indicate the angular position of a rotatable shaft by providing electrical output signals which are essentially the sine and cosine function of the extent of rotation of the input shaft. In such encoders, the shaft is typically associated with a rotatable disc that is ruled with alternately opaque and transparent radial sectors to provide a plurality of reticle cycles, where each cycle includes an opaque and a transparent sector. Analogous encoders can also be used to indicate the linear position of a translatable member associated with, for example, a translatable member ruled with a plurality of reticle cycles oriented perpendicularly to the member's direction of motion. The quadrature-phased sine and cosine signals are then processed to provide an indication of the extent and sense of shaft or member movement. Signal processing can be accomplished in a digital manner. It is desireable to provide an extremely high-resolution digital output indicating shaft position based on the sine and cosine output signals of an electro-optical encoder.

To accomplish digital signal processing of such output signals, it is known to first multiply both the sine and cosine signals by a stored digital representation of a function of output angular data. The resulting signals are then added so as to provide an error signal which is used to control a digital counter such that a digital output signal is provided that represents analog input angular data. The digital resolver of the invention includes an up-down counter, and a counter controller operative to receive the error signal and drive the counter accordingly. Within the counter controller, an error signal is typically used in conjunction with a clock signal to selectively activate an appropriate input of the up-down counter, the output of which is fed back to address the memory, also providing a digitized representation of the shaft's displacement within a reticle cycle.

However, employing a clock signal results in some critical limitations on the overall performance of the interpolator. For example, the maximum count rate is limited to the frequency of the clock source. If the count rate exceeds the clock rate, an error results. Also, unless the detector recognizes a non-zero error signal exactly when a clock cycle begins, counting is delayed until the beginning of the next clock cycle. Furthermore, if the angular velocity of the shaft is changing, or if it is constant but not an integral multiple of the clock frequency, more than a single cycle will be required to accurately represent a multiplication of the input frequency by the digital representation of a function of the output angular data. This appears to the user as "jittering" of the digital representation of the input analog signal from cycle to cycle. At low shaft velocities this effect is negligible; but, as the rate of rotation increases, jittering can become quite significant.

SUMMARY OF THE INVENTION

A digital resolver is provided that accepts an analog representation of the angular or linear displacement within a reticle modulation cycle of a rotatable or translatable member, and provides a highly accurate digital representation of the displacement within the cycle, even during rapid movement of the member. An encoder cooperative with the interpolator receives an analog signal that represents the displacement, and yields a pair of quadrature-phased sine wave signals in accordance with the displacement. In particular, the encoder provides the interpolator with two inputs, $\sin(x)$ and $-\cos(x)$, where x is in radians and can be related to linear displacement d by the relation $x = 2\pi N d$, where N is a measure of the number of reticle cycles per unit of linear distance. Alternatively, x can be related to angular displacement $\theta$ by the relation $x = 2\pi N\theta$, where N is the number of reticle cycles per revolution of a disk. The $\sin(x)$ and $-\cos(x)$ signals are each multiplied by a stored digital representation of a trigonometric function of the interpolated input analog signal y. The resulting signals are then added so as to provide an error signal $-\sin(x-y)$ which is used to control a digital control loop, such that a digital output signal y is provided that represents displacement within a reticle cycle. The control loop includes an up-down counter, and an asynchronous count generator (ACG) operative to receive error signal threshold information from a detector and drive the counter promptly thereafter. Within the ACG, no clock signal is employed. Instead, an asynchronous digital circuit provides a count pulse to an appropriate input of the up-down counter, the output of which represents the digitized position of the member within a reticle cycle, and is fed back to address the memory.

In a preferred embodiment, the ACG includes a detector that recognizes when an input analog signal changes faster than a single-stepping mode of operation can accommodate by detecting when the error signal is larger than a reference threshold. A multi-stepping mode allows the ACG to follow a more rapidly changing input signal by providing a count rate that is faster than the count rate of the single stepping mode.

A digital resolver that incorporates an ACG overcomes the limitations inherent in employing a clock signal source to drive the ACG. The count rate is then limited only by the rate at which all components in the ACG can respond. Thus, as soon as the detector indicates that the error signal is no longer zero, the ACG promptly provides a count pulse to the counter, without waiting for a clock pulse. The interpolator of the invention will always be able to exactly represent the multiplication of the input frequency up to the full bandwidth of the entire circuit. Also, all transitions of the digital output will be smooth instead of staggered; there is no jittering.

DESCRIPTION OF THE DRAWING

The invention will be more fully understood from the following detailed description in conjunction with the accompanying figures, in which.

DETAILED DESCRIPTION OF THE INVENTION

Figure 1:
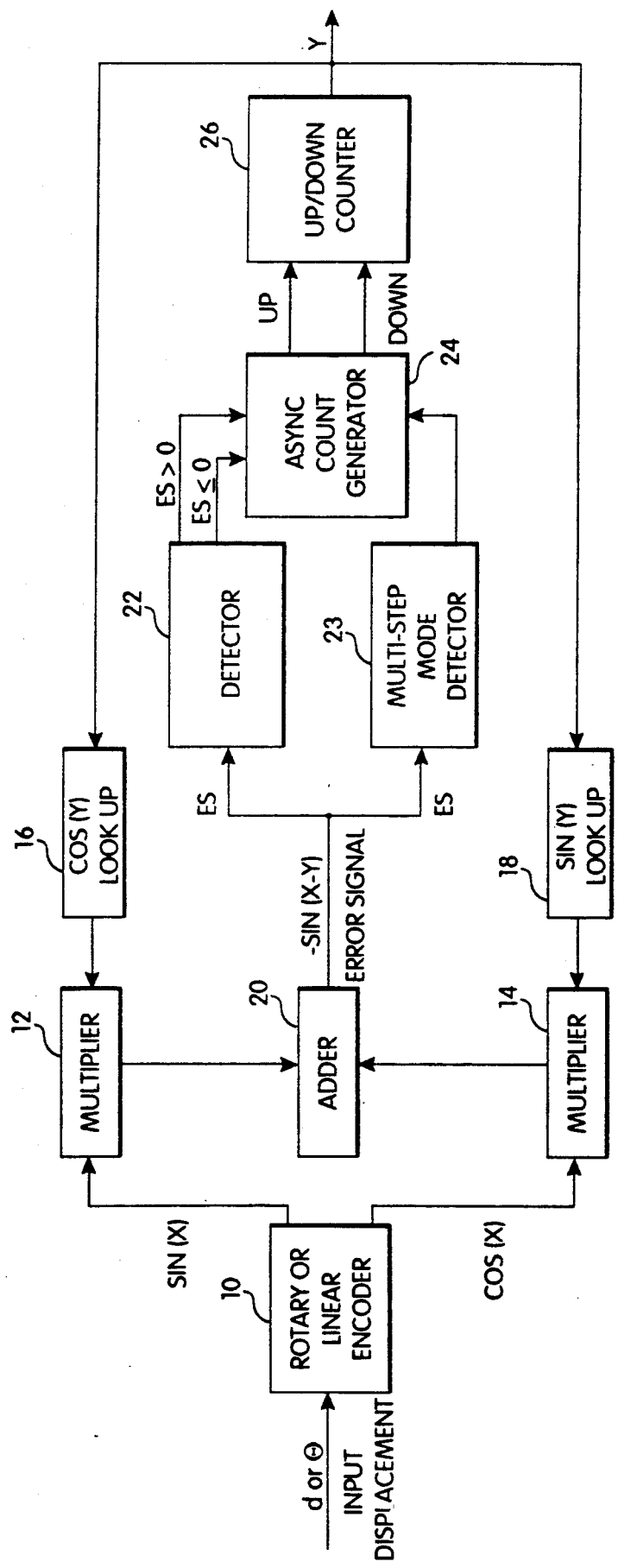
FIG. 1 is a block diagram of the digital resolver of the invention.

A system embodying the invention is shown in FIG. 1. The input signal to the system is an analog representation of a displacement (angular or linear) within a reticle cycle. An encoder 10 performs both a sine and a cosine function on the value of x, and provides an analog sin(x) and −cos(x) signal to a respective input of multipliers 12 and 14. Note that x is in radians, and can be related to linear displacement d by the relation $x = 2\pi Nd$, where N is a measure of the number of reticle cycles per unit of linear distance. Alternatively, x can be related to angular displacement $\theta$ by the relation $x = 2\pi N\theta$, where N is the number of reticle cycles per revolution of a disk. The multipliers 12 and 14 are multiplying digital-to-analog converters that cause a digital input to attenuate an analog current reference signal according to sine and cosine function, the resulting outputs forming the sine and cosine outputs, as is well known in the art. Multipliers 12 and 14 may also include an operational amplifier that scales and level shifts the signal provided by the encoder before it enters a multiplying digital-to-analog converter. The digital input of the multipliers 12 and 14 is provided by the lookup modules 16 and 18, respectively. The modules 16 and 18, typically integrated circuit read-only memories, provide a digital value of cos(y) and sin(y) upon receiving a new value of y, which serves as an address to the trigonometric information stored in the modules 16 and 18. To obtain a value of y, each multiplier 12 and 14 provides an analog signal to an adder 20, the output of which is an analog error signal ES, i.e., a function of the difference between the values of x and y, namely, −sin(x−y). The multipliers 12 and 14 and the adder 20 are connected so as to implement the following trigonometric identity:

$$ES = -\sin(x-y) = -\sin(x) \cdot \cos(y) + \cos(x) \cdot \sin(y).$$

Figure 2:
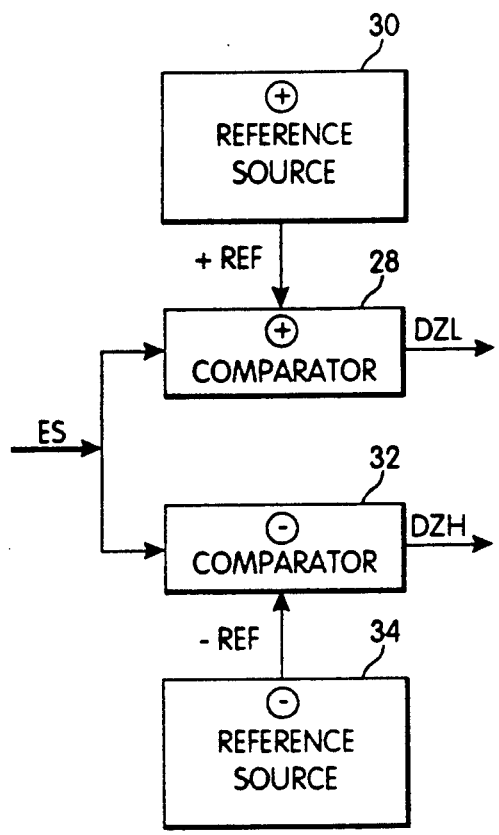
FIG. 2 is a block diagram of an embodiment of the detector of FIG. 1.

The error signal ES is received by a detector 22. The function of the detector 22 is to sense when the error signal ES is zero, positive, or negative. A practical implementation of the detector 22 employs two comparators and two reference sources, as shown in FIG. 2. One comparator 28 triggers when a positive signal exceeds a positive threshold +REF.1, causing DZL to go high, and another comparator 32 fires when a negative signal exceeds a negative threshold −REF.1, causing DZH to go high.

Figure 3:
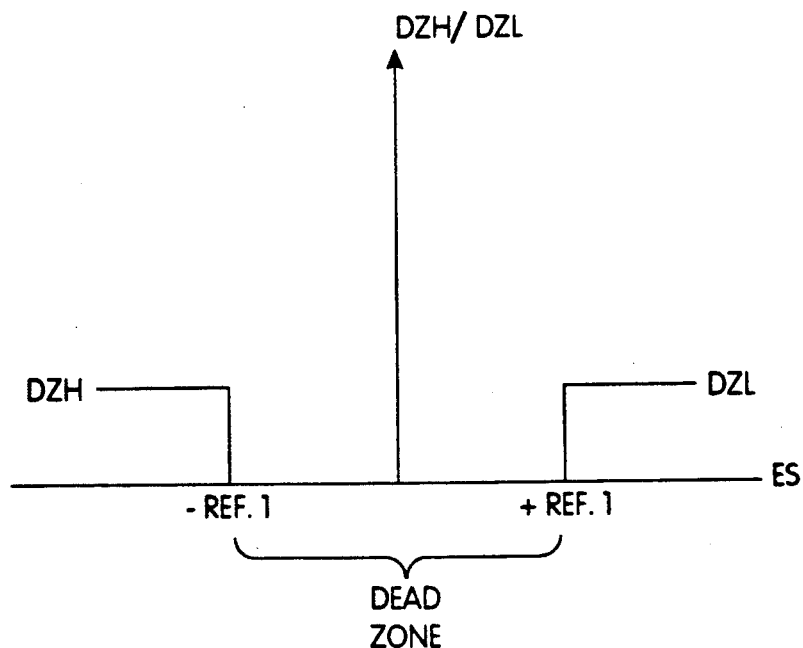
FIG. 3 is a representation of the dead zone of the detector of FIG. 2.

Referring to FIG. 3, a dead zone exists between the levels +REF.1 and −REF.1 where neither comparator triggers. The presence of the dead zone prevents spurious triggering due to signal noise. Thus, neither comparator triggers until the error signal ES deviates appreciably from zero.

With reference again to FIG. 1, an asynchronous count generator 24 receives the high signals on DZL and DZH, in turn producing signals suitable for driving an asynchronous up-down counter 26. An asynchronous device does not require a clock signal. Instead, it derives timing information solely from the interaction of the input data signals with the internal delays of its components. The output of the counter 26 is the value of y, which is fed back to the lookup modules 16 and 18. The output of the counter 26 is also the output of the overall system shown in FIG. 1.

The counter 26 in the present embodiment counts from 0 to 199, for a total of 200 counts per reticle cycle. Therefore, one count represents 1/200th of a complete reticle cycle. To achieve higher resolution, the counter 26 must be chosen to count higher than 200 counts, and new trigonometric values must be stored in the lookup tables 16 and 18 in accordance with higher resolution in the input variable y.

Figure 4A:
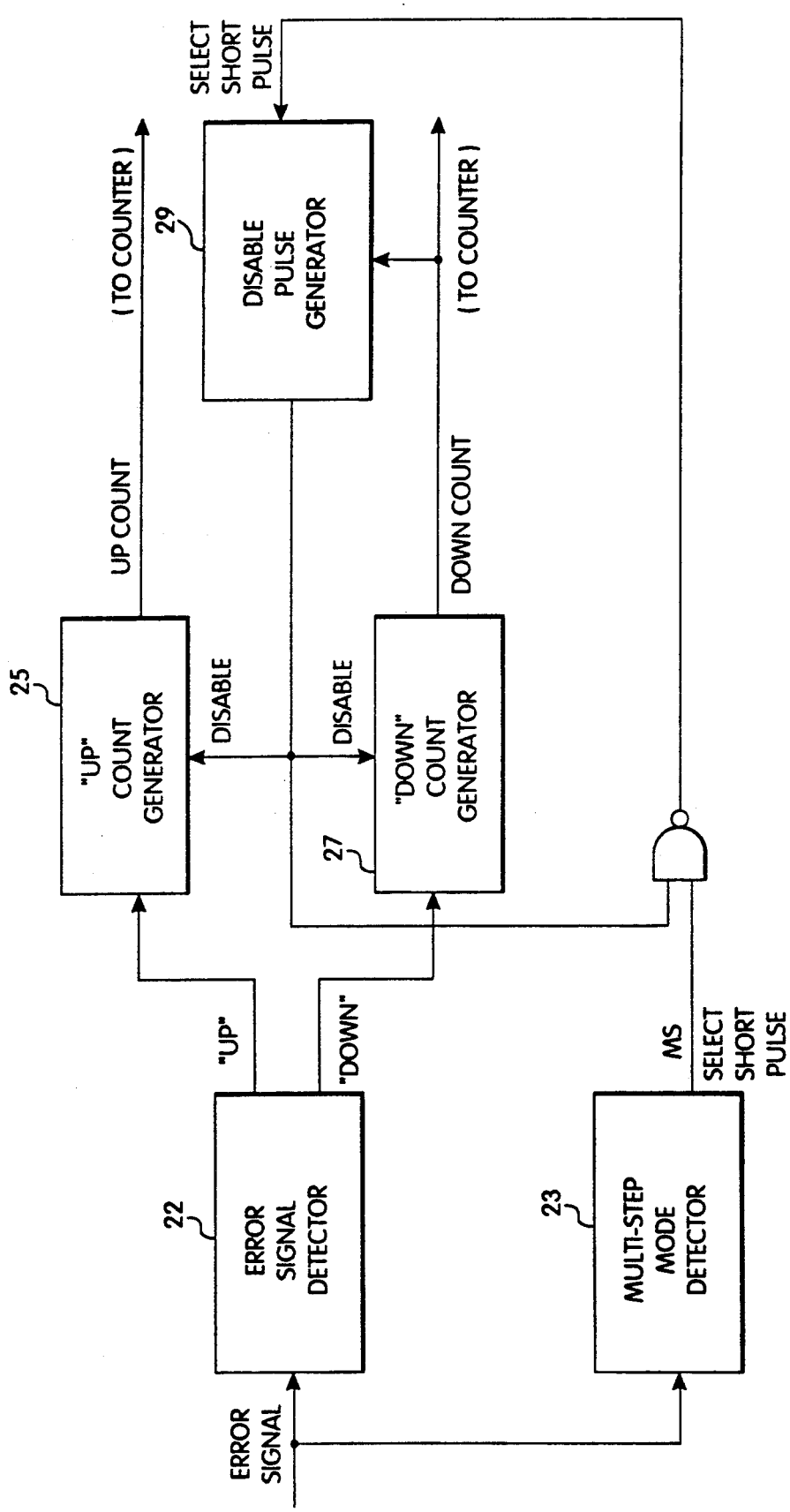
FIG. 4A is a block diagram including high-level components of the asynchronous count generator of FIG. 1.

With reference to FIG. 4A, the asynchronous count generator includes an "up" count generator 25, a "down" count generator 27 and a disable pulse generator 29. The error signal ES is provided to the error signal detector 22. The detector 22 issues either a pulse to the "up" count generator 25 or to the "down" count generator 27 in accordance with the thresholds ±REF 1, as discussed above. The generators 25 and 27 are functionally the same, and generate count pulses at a duty cycle and frequency that is determined by the internal delays inherent within each. In single-stepping mode, a count pulse is generated and received by the disable pulse generator 29, which in turn generates a disable pulse that disables the generators 25 and 27. The pulse is of a duration sufficient to allow the lookup tables 16 and 18, the multipliers 12 and 14, and the adder 20 perform their respective functions to provide a new value of the error signal ES to the detector 22. If the pulse is of short duration, the counter appears to count in multiple steps, as will be discussed further below.

Figure 4B:
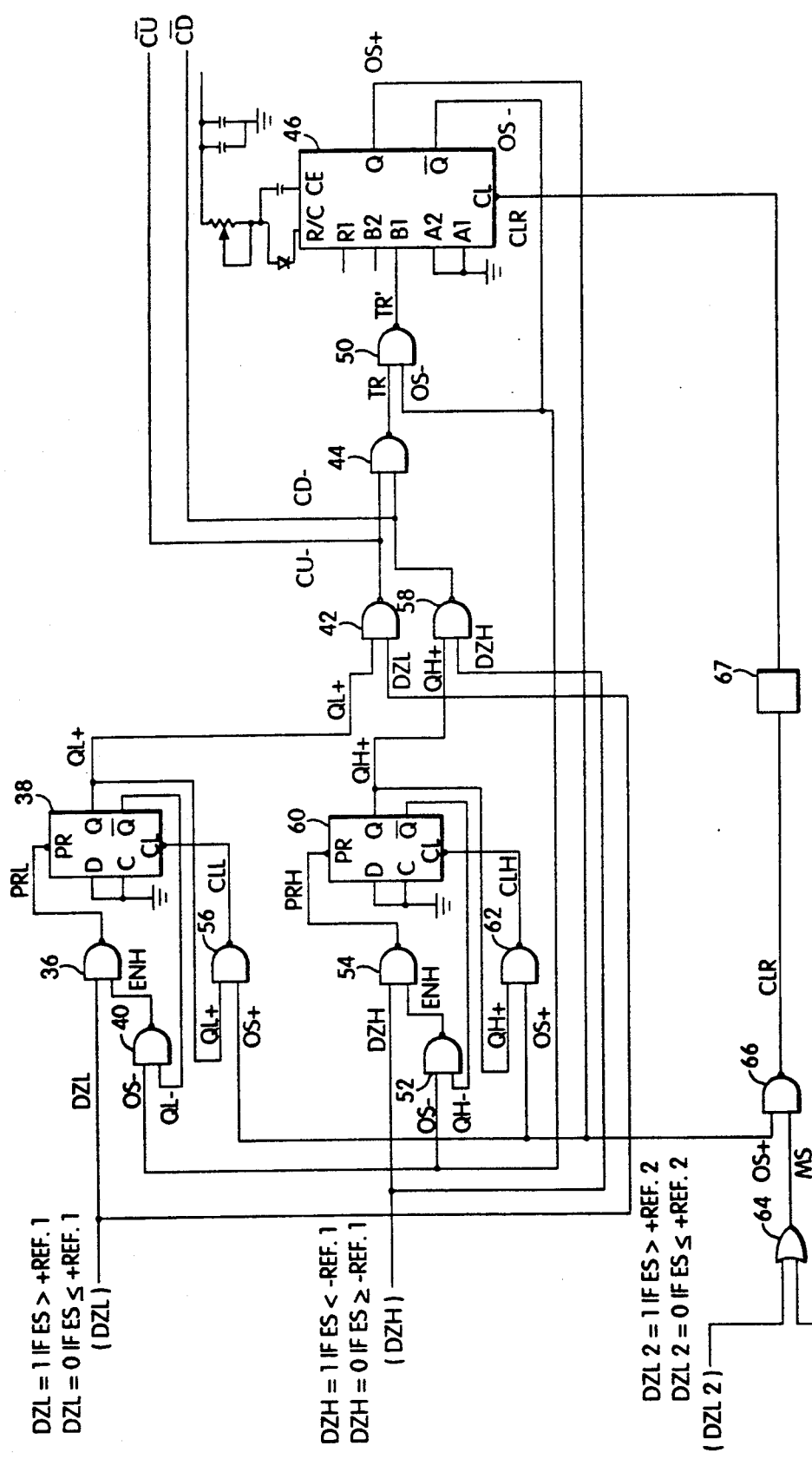
FIG. 4B is a schematic diagram of the circuitry of an embodiment of the asynchronous count generator of FIG. 1.
Figures 5A, 5B, 5C:
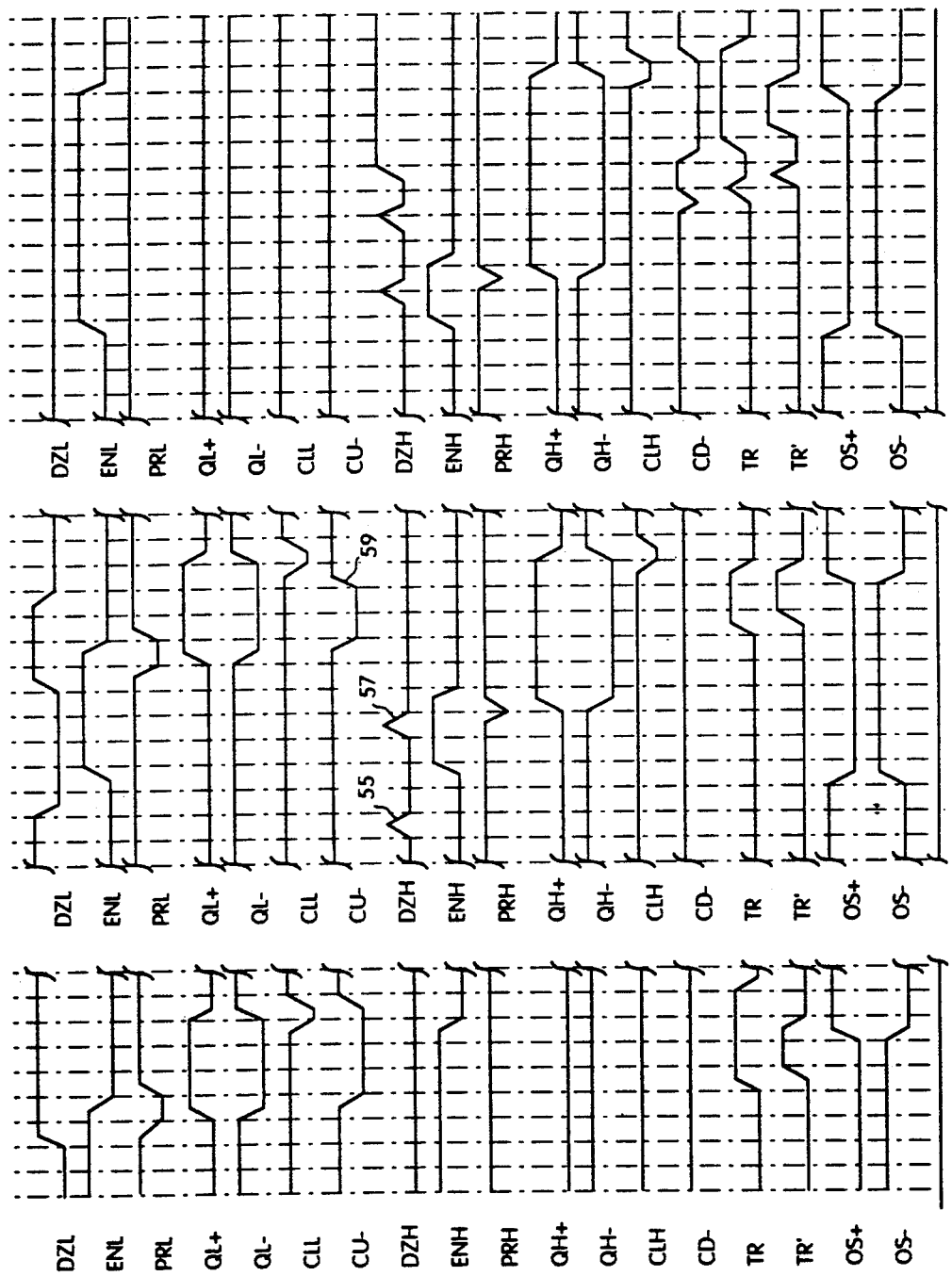
FIGS. 5A, 5B and 5C are timing diagrams illustrating the operation of the circuit of FIGS. 4A and 4B.

Referring to FIGS. 4B and 5A, the asynchronous count generator 24 operates without employing a clock signal. Instead, the circuitry of generator 24 responds promptly to an incoming signal from an output of the detector 22. A more detailed analysis of the generator 24 shows that, if the error signal ES is sufficiently positive, i.e., ES>0, then the DZL signal enters a high state (i.e., true, or 1), and DZH enters a low state (i.e., false or 0). While ENL is high, a NAND gate 36 receives DZL and drives PRL into a low state, which activates a preset mode of a dual D-type positive-edge-triggered flip-flop with preset and clear 38, with its clock and D inputs tied to ground, thereby driving QL+ high and QL− low. While OS− and DZL are high, AND gate 40 receives QL− and drives ENL low, and NAND gate 42 receives QL+ and drives CU− low. Consequently, NAND gates 36 and 44 drive PRL and TR high, respectively. A NAND gate 50 receives TR and then drives TR' high, which is received by a monostable or retriggerable multivibrator (one-shot) 46. After approximately two typical state delay periods, the one-shot 46 generates a long pulse, resulting in OS+ entering a long-lived high state, and OS− transitioning from a high state to a long-lived low state. A variable resistance 48 is set so as to insure that the duration of the pulse is sufficiently long to allow the overall circuit 24 to enter a quiescent state following a change in state of either DZL or DZH.

The purpose of the one-shot 46 is to prevent another count pulse from occurring before the entire interpolator feedback loop is settled on a new value of y. More specifically, the one-shot 46 is calibrated so as to provide sufficient time to access the look-up tables 16 and 18, convert the digital trigonometric representations to an analog signal, and have the detector 22 react accordingly. By contrast, in a multi-stepping mode, discussed below, the one-shot 46 is disabled, thereby increasing the rate of pulses produced by the ACG. The value of y will then advance faster than the rest of the digital resolver circuitry can follow, causing the counter to advance many steps at a time.

Since TR is high, AND gate 50 drives TR' low, while the falling state of OS− is received by an AND gate 52, which then drives ENH low. Concurrently, the falling state of OS+ is received by a NAND gate 56, and since QL+ is high, CLL is driven into a low state. The fall of CLL is received by the flip-flop 38, which transitions to a "clear" state, thereby driving QL+ low and QL-high. Consequently, NAND 42 drives CU− high, and NAND 56 drives CLL high.

To summarize, the rise of DZL initiates a falling edge signal PRL via the NAND gate 36 that places the flip-flop 38 into a "preset" mode. Via a first feedback path extending from a complementary output QL− of the flip-flop 38, through the AND gate 40 and the NAND gate 36, PRL is restored to a high state. Also, via a second feedback path extending from the output QL+ of the flip-flop 38, through the NAND gate 42, the count-up signal CU− is pulled down to a low state. A third feedback path, extending from NAND gate 42 and through NAND gate 44, AND gate 50, one-shot 46, and NAND gate 56 serves to restore CU− to a high state, and so terminate a count-up pulse that is received by the up-down counter 26. The delay introduced by the gate 56 determines the width of the pulse, as will now be explained.

To count up, the up-down counter 26 responds to the rising edge of the count-up pulse, i.e., a falling edge followed by a low state followed by a rising edge. Likewise, to count down, the counter 26 responds to the rising edge of a count-down pulse. However, a rising edge must be preceded by a low state for a minimum duration. In the case of a 74ALS193 up-down counter, for example, the minimum duration of the low state must be 15 nanoseconds. The minimum low state duration is achieved by the delay introduced by the NAND gate 56 which receives OS+ going high while QL+ is high, thereby driving CLL low, putting flip-flop 38 into the clear mode. Consequently, QL+ goes low, and since DZL is high, NAND gate 42 drives CU− high, terminating the count-up pulse.

With reference to FIG. 5B, which illustrates a typical response of the asynchronous count generator 24 to spikes or "glitches" on its "count down" input port, i.e., DZH rises over one gate delay period and immediately falls over one gate delay period. A first spike 55 arrives while ENH is low, and so PRH does not place a flip-flop 60 into a pre-set mode. ENH rises thereafter, and so a second spike 57 does cause PRH to fall, which in turn places the flip-flop 60 into a pre-set mode, thereby causing QH+ to rise. However, since the spike 57 has a total duration of only two typical gate delay periods, a count down pulse on CD− is not produced. To produce a count-down pulse, Both DZH and QH+ must be in a high state. Although a spike can cause the flip-flop to re-enter a pre-set mode, bringing QH+ high, only a more long-lived pulse on DZH can both cause the flip-flop to enter a pre-set mode and still present a high state to the NAND gate 58 to produce an output count-down pulse on CD−. Thus, the NAND gate 58, and by symmetry, the NAND gate 42, in combination with the flip-flops 60 and 38, respectively, provide immunity to input spikes.

Also note that when DZL rises, and subsequently ENL falls, the result is a pulse, the leading edge of which places the flip-flop 38 into a pre-set mode, as in FIG. 5A. Also as before, the pre-set mode lasts only until a falling edge of a pulse on CLL places the flip-flop 38 into the clear mode. Unlike the case of FIG. 5A, the duration of a pulse 59 on CU− is determined not by the amount of time that the flip-flop 38 spends in the pre-set mode, but instead by the falling edge of DZL. Although the flip-flop transitions from the pre-set mode to the clear mode when CLL goes low, since DZL is already low, CU− remains high. Thus, either the fall of DZL or the change of state of the flip-flop will define the end of the pulse 59. DZL is used to act as a filter for preventing short lived pulses on DZL from causing the counter to count up.

FIG. 5C illustrates another fundamental property of the count generator 24; a count-up pulse on CU− is mutually exclusive of a count-down pulse on CD−. The generator 24 is sensitive to direction of counting, i.e., up or down. The generator 24 cannot produce count-up and count-down pulses simultaneously. It generates maximally narrow count pulses and provides them to the counter 26. In single-stepping mode, the generator 26 becomes inactive for a specified amount of time immediately after each pulse. The generator is self resetting, i.e., it does not lock up in a power-up condition or any other condition. As long as the detector 22 indicates that the error signal ES is not zero, the generator 24 continues to process counts.

If x changes faster than the electronics of the digital resolver can track in single-stepping mode, y will not accurately represent the value of x. This is because each time the value of y is changed, new values for SIN(y) and COS(y) must be retrieved, requiring a finite amount of time. Additionally, these values must then be multiplied by trigonometric functions of x in the multipliers 12 and 14, an operation that requires more time. One way to insure that the interpolator keeps up with a rapidly changing value of x would be to decrease the interpolator's resolution. In this case, y would be incremented in, for example, increments of 7.2° instead of 1.8°. Thus, for each reticle cycle, the interpolator would increment y only 50 times instead of 200 times, and so it could track a rate of change in x that is four times greater than the single-stepping mode. However, a tradeoff has been made between resolution and tracking speed. To overcome this problem, a multi-stepping mode is provided that allows the interpolator to follow a rapidly changing value of x, while preserving the resolution of the digitized output value y. Resolution is maintained by rapidly incrementing y, but using only every fourth value of (in the above example, four steps at a time). Thus, at high rates of change of x, only instantaneous accuracy is compromised, but resolution is preserved. At lower rates of change of x, the interpolator switches back into single-stepping mode, and accuracy returns.

Referring again to FIG. 4A, when the error signal ES changes faster than the single-stepping mode can respond, a multi-step mode detector 23 is triggered and issues a pulse to the disable pulse generator that causes a shorter disable pulse to be sent to the count generators 25 and 27. This pulse is of significantly shorter duration than the pulse issued during single-stepping mode. Consequently, the counter will count at a faster rate that is characteristic of the "multi-stepping" mode. The counter still counts one step at a time. However, the rate of counting is so fast that the multiplier units 12 and 14 of FIG. 1, cannot keep up and thus provide the adder 20 with periodically selected values of y that appear to increase many steps at a time. However, the values of y are presented by the multipliers 12 and 14 at a rate that is comparable to the rate that the adder 20 receives them in the single-stepping mode, and so the rest of the circuit is able to respond fully, resulting in a new value of the error signal ES. Thus, in the multi-stepping mode, the count generator 24 can respond to a rapidly changing input signal x. When the rate of change of x decreases so that the error signal ES falls below a threshold ±REF.2, the count generator 24 returns to the single-stepping mode.

Figure 6:
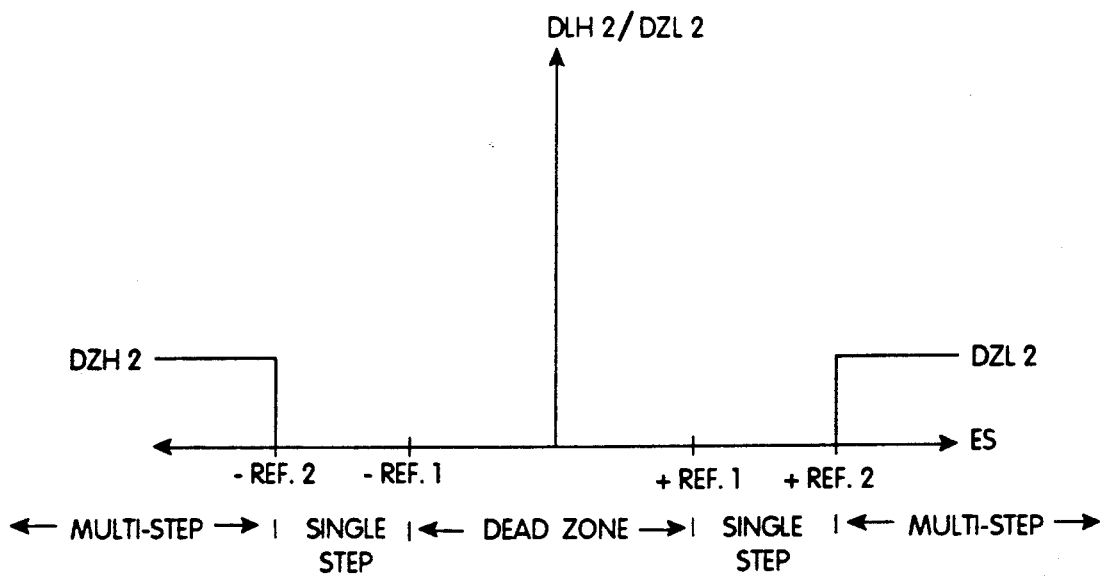
FIG. 6 is a representation of the multi-stepping zone of the comparator pair of FIG. 7.
Figure 7:
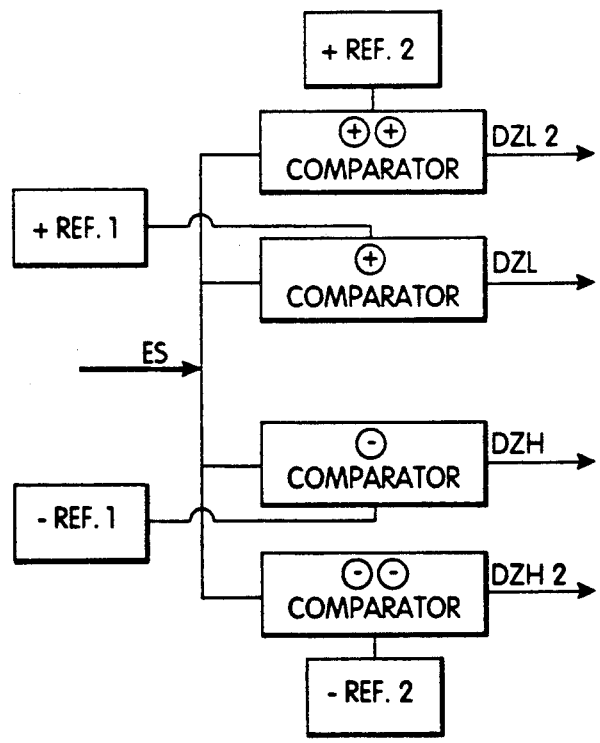
FIG. 7 is a block diagram of an embodiment of a detector operative to implement a multi-stepping mode.

With reference to FIG. 6, when the value of x changes faster than the digital resolver can follow in the single-stepping mode, the magnitude of the error signal |ES| exceeds the magnitude of a second threshold value |REF.2|. When this condition occurs, the generator 24 enters the multi-stepping mode. In the multi-stepping mode, y appears to the adder 20 to be incremented or decremented multiple steps at a time thereby bringing ES towards zero more rapidly than can the single-stepping mode. As ES approaches zero and becomes lesser in magnitude than |REF.2|, the generator returns to the single-stepping mode.

With reference to FIG. 4B, when |ES| exceeds |REF.2|, either DZL2 or DZH2 goes high. The OR gate 64 then drives MS high, and if OS+ is also high, indicating that the one-shot 46 is set, CLR will go high. This signal will be held by a delay buffer 67, which in the preferred embodiment is a 50 ns delay buffer. The buffer 67 is included to insure stable operation. When the pulse from the delay buffer 67 reaches the one-shot 46 of FIG. 4, the one-shot will be disabled, and consequently produce a short pulse. After the short pulse, OS+ will go low and the one-shot 46 will be enabled, causing the count to be incremented. The intrinsic delays of the overall circuit of FIG. 4 will determine the number of steps that the ACG will increment at one time, e.g., four counts. When |ES| drops below |REF.2|, MS will go low, and the ACG will return to the single-stepping mode accordingly.

In multi-stepping mode, the frequency of pulses generated by a count generator 25 or 27 must not exceed the frequency that the counter can accept. In this event, the digital resolver will not accurately reflect the value of the input signal.

Other modifications and implementations will occur to those skilled in the art without departing from the spirit and the scope of the invention as claimed. Accordingly, the above description is not intended to limit the invention except as indicated in the following claims.

What is claimed is:

1. A digital resolver for providing a digital representation of linear or rotational motion within a reticle cycle comprising:

an encoder operative to receive position information and provide a trigonometric transformation of said position information;

a pair of memories operative to receive address information and provide a trigonometric transformation of said address information;

a pair of multipliers, each connected to said trigonometric encoder and a respective memory, and operative to receive and multiply said trigonometric transformation of said position information and said trigonometric transformation of said address information to form and provide a pair of products;

an adder, connected to each multiplier, and operative to add said pair of products to form and provide a sum;

a threshold detector, connected to said adder, for receiving said sum and providing a threshold signal to indicate that the magnitude of said sum exceeds a threshold value;

a count generator, connected to said threshold detector, and operative to function digitally without a clock signal, for promptly providing a series of up-count pulses or a series of down-count pulses in accordance with said threshold signals, wherein said count generator includes:

an up-count generator connected to said detector, and operative to provide an up-count pulse to said counter;

a down-count generator connected to said detector, and operative to provide a down-count pulse said counter; and a disable pulse generator connected to said up-count generator and said down-count generator, and operative to provide a disable pulse to said up-count generator and said down-count generator, and adapted to receive count-up and count-down pulses from said generators;

a counter, connected to said counter generator and to each of said memories, and operative to increment or decrement a count variable in response to each of said up-count pulses and said down-count pulses respectively, and to provide said count variable to each of said memories, said count variable also serving as a digital representation of position within a reticle cycle.

2. The digital resolver of claim 1 further including a rate detector for detecting when said position information changes more rapidly than said count generator can accommodate in a single-stepping mode, and for providing a signal to said count generator that places said generator in a multi-stepping mode, said mode being operative to provide count signals to said counter at a faster rate than in said single-stepping mode.

3. The digital resolver of claim 1 wherein said disable pulse generator is adapted to receive a pulse ultimately generated by a multi-stepping mode detector operative to cause said durable pulse generator to generate a short pulse when an error signal exceeds a given threshold.

4. An asynchronous count generator for use in a high speed cycle interpolator operative to provide a digital representation of linear or rotational motion within a reticle cycle, said asynchronous count generator comprising:

an up-count generator operative to receive an up-pulse from an error signal detector and operative to provide a series of up-count pulses to a counter;

a down-count generator operative to receive a down-pulse from said error signal detector and operative to provide a series of down-count pulses to said counter; and a disable pulse generator operative to deliver a disable pulse to said up-count generator and said down-count generator, and adapted to receive count-up and count-down pulses from said generators, wherein an output of said counter is effectively a digital representation of linear or rotational motion within a reticle cycle.

5. The asynchronous count generator of claim 4 wherein said disable pulse generator is adapted to receive a pulse ultimately generated by a multi-stepping mode detector operative to cause said disable pulse generator to generate a short pulse when an error signal exceeds a given threshold.

* * * * *

UNITED STATES PATENT AND TRADEMARK OFFICE
CERTIFICATE OF CORRECTION

PATENT NO. : 5,079,549
DATED : January 7, 1992
INVENTOR(S) : Christopher W. Liessner It is certified that error appears in the above-identified patent and that said Letters Patent is hereby corrected as shown below:

On the title page:
Before the Abstract, after Attorney, Agent, or Firm -, "Cagnebin" should read --Gagnebin--.

In the line identified as [54], in the Title, "A SYNCHRONOUS" should read --ASYNCHRONOUS--.

Column 1, line 2, in the Title, "A SYNCHRONOUS" should read --ASYNCHRONOUS--.

Column 6, line 58, "every fourth value of (in" should read --every fourth value of y (in--.

Column 8, line 55, "to cause said durable pulse" should read --to cause said disable pulse--.

Signed and Sealed this

Sixth Day of July, 1993

Attest:

MICHAEL K. KIRK

Attesting Officer

Acting Commissioner of Patents and Trademarks